June 12, 1956     A. HASBROUCK     2,750,047
FILTER

Filed Nov. 2, 1949     2 Sheets-Sheet 1

INVENTOR.
Augustus Hasbrouck
BY Jack N. McCarthy
Agent

June 12, 1956 — A. HASBROUCK — 2,750,047
FILTER
Filed Nov. 2, 1949 — 2 Sheets-Sheet 2

INVENTOR.
Augustus Hasbrouck
BY Jack N. McCarthy
Agent

United States Patent Office 2,750,047
Patented June 12, 1956

2,750,047
FILTER

Augustus Hasbrouck, Middletown, Conn., assignor to United Aircraft Corporation, East Hartford, Conn., a corporation of Delaware Application November 2, 1949, Serial No. 125,107

11 Claims. (Cl. 210—183)

This invention relates to filters and to the construction of the filtering units therefor.

An object of this invention is to provide a filter having a filtering unit comprising a series of stacked plates through which the flow of fluid to be filtered is substantially radial.

Another object is to construct a filtering unit which will provide individually detachable and replaceable filtering plates so that they can be easily cleaned or replaced.

Another object is to provide a filter with spacer plates which will prevent the filtering plates from collapsing and thereby rendering the filter ineffective.

A further object of this invention is to provide a filter having a maximum filtering area for the available volume of space to be used for filtering.

Other objects and advantages will be apparent from the specification, and from the accompanying drawings which illustrate an embodiment of the invention.

Figure 1:
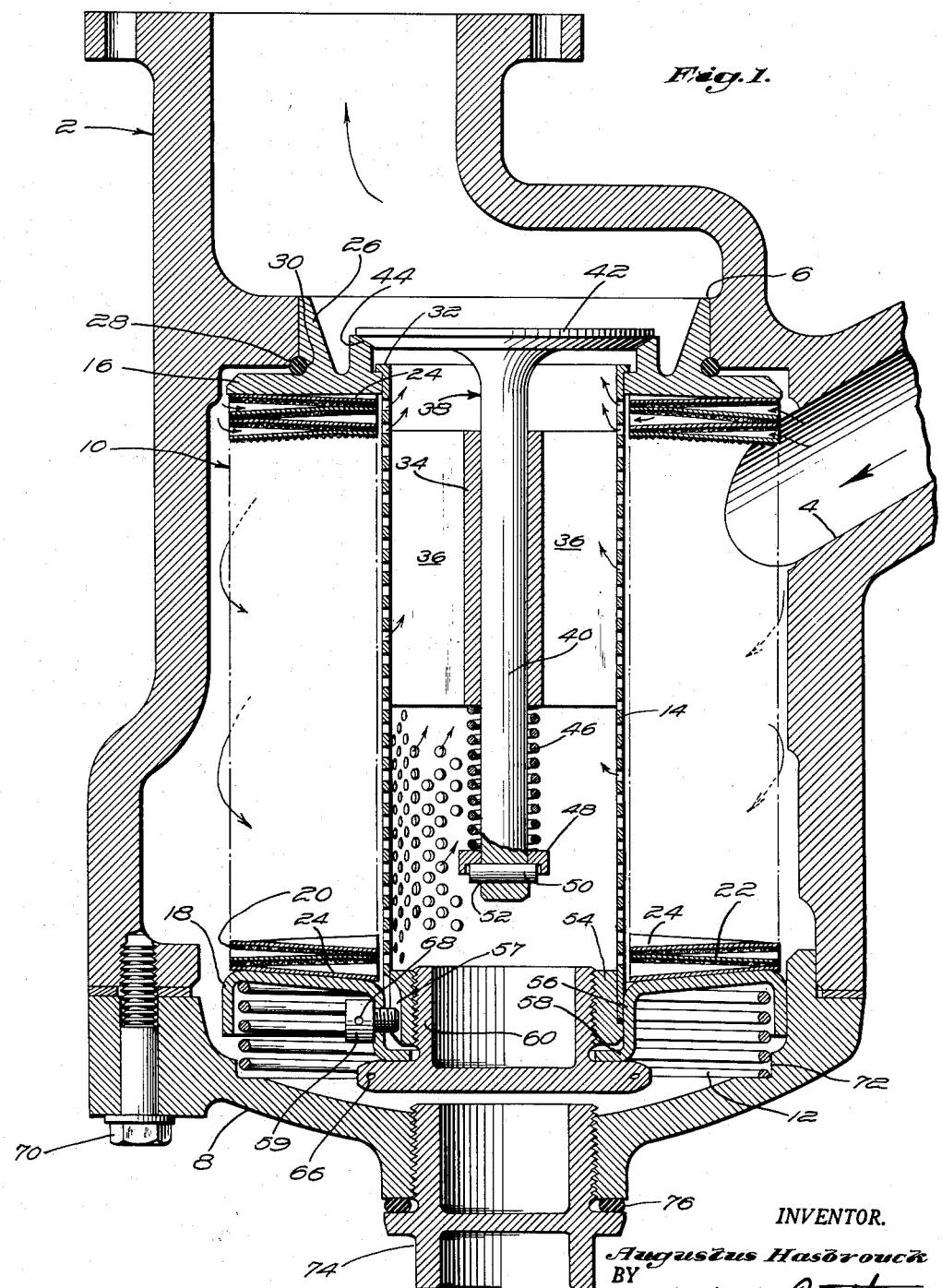
Fig. 1 is a vertical view in partial section of a filter showing a construction which is in accordance with the invention.

Referring to the figures, Fig. 1 shows the construction of the fluid filter consisting of two main parts. One part is the filter body, or housing unit 2 which is shown as a cylindrical member having an inlet 4 for the fluid to be filtered, an outlet 6 for the filtered fluid and a removable cover 8. The other part is the filtering unit, or screen assembly, 10, which is contained within said housing unit and held in an operative position therein by a spring 12.

The filter body 2 can be constructed in any number of ways according to the size and shape of body desired. An individual body or housing unit can be mounted by means of straps or bolts on a device on which it is to be used or it can be made integral with said device. For example, in an aircraft engine, the body, or housing, may be made integral with the rear section.

The filtering unit 10, through which the actual filtering action is performed, is a composite removable unit which when removed from the filter body 2 can be disassembled so that the individual elements can be closely inspected.

The member around which the filtering unit 10 is built up is a perforated central tube 14, having a circular plate 16 rigidly attached to its upper end, and a circular support plate 18 adjustably slidable over its lower end. On the tube between the two circular plates are alternately stacked filter elements 20 and filter element spacers 22 and 24 to be hereinafter described.

The upper circular plate 16 has a smaller annular projection 26 extending upwards therefrom which slidably fits into the outlet opening 6 in the filter body 2 and provides a seal therewith. A further seal is provided by a rubber O ring 28 placed in a shallow annular groove 30 which is cut in the side of the annular projection 26 where it meets the larger circular plate 16. Sealing is provided at this point to prevent unfiltered fluid from passing through the outlet.

The perforated tube 14 is brazed or welded to the inner diameter of the upper circular plate 16 with the top of the tube being flared over the plate slightly as at 32. However, the tube can be fixed to the circular plate by any means desired.

Within the top of the perforated tube 14 a check valve guide 34 is supported by two or more webs 36. A check valve 38 is placed with its stem 40 in the guide 34 and its head 42 seated on a valve seat 44 formed on said circular plate 16. A spring 46, over the stem protruding below the guide 34, is held in a compressed state against said guide by a countersunk washer 48 on the end of the stem which is held on by a pin 50 which fits into a hole 52 in the stem and within the countersunk portion of said washer. This check valve prevents the oil from flowing in a reverse direction through the filtering unit.

The lower adjustable circular support plate 18, as mentioned hereinbefore, fits over the lower end of the perforated tube 14. This lower end of the tube has fixed therein an internally threaded bushing 54. This circular plate has substantially a channel shaped cross section with the circumference of the inner side 56 of the channel slidable on the tube with the end of that side flared over the tube at 58 to act as a stop. This flare also forms a bearing ring on which the head of an externally threaded adjusting bolt 60, screwed into internally threaded boss 54, bears to compress the filter elements 20, and spacers 22 and 24, between the upper and lower circular plates. To prevent relative rotation between the tube 14 and plate 18, a notch 57 is provided in the tube 14 and bushing 54 to receive a small screw 59 which is located on the inner side 56 of the channel. This arrangement permits longitudinal movement between the tube 14 and plate 18.

Figure 3:
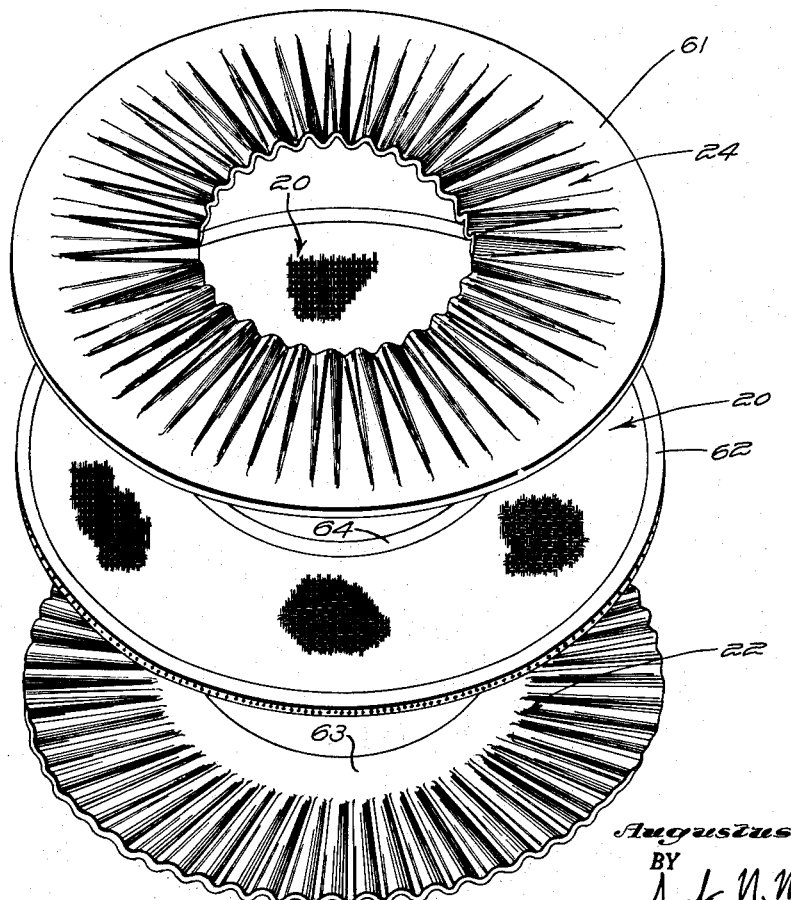
Fig. 3 is an exploded view showing a filtering element and filtering element spacers in their relative position in an assembled filter.

Noting Fig. 3, there are two types of spacers. Each spacer has inner and outer edges; however, one spacer 22 has corrugations extending radially from the outer edge substantially to the inner edge, which is flat, as at 63, and the other spacer 24 has corrugations extending radially from the inner edge substantially to the outer edge, which is flat, as at 61. These spacers are alternately stacked from the top to the bottom of the filtering unit 10 with a filtering element 20 between each of the spacers 22 and 24. As can be seen in Fig. 1, the upper and lower circular plates 16 and 18 are tapered so that a spacer 24 having an outer flat edge is placed against these plates.

However, these plates can be tapered so that a spacer 22 having an inner flat edge will fit as an end spacer. The height of the tube 14, and thereby the number of filtering elements and spacers to be used, is determined by the amount of fluid to be filtered.

Figure 2:
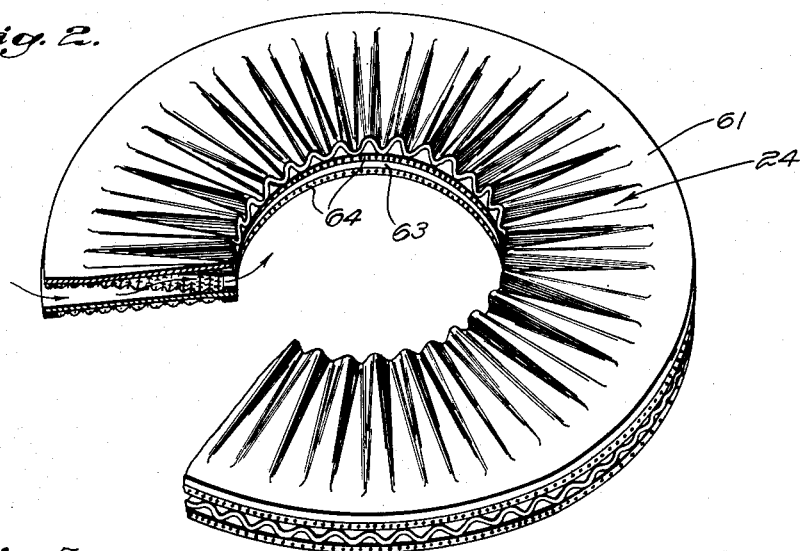
Fig. 2 is a perspective view in partial section of a group of assembled filtering elements and filtering element spacers showing the flow of fluid.

The spacer 22 having the outer corrugations permits the oil from inlet 4 to enter into the filtering unit 10, see Figs. 1 and 2, and come into contact with a filtering element. Spacer 24 having the inner corrugations permits the oil to flow from the filtering element to the tube 14.

The filtering element 20 is constructed with a solid outer edge 62 and solid inner edge 64. For example, if a wire screen filtering element is used the solid edges could be formed of solder. These solid portions of the filtering element form a sealing surface with the spacers and also prevent the filtering elements from unraveling on the edges. For example, it would prevent the wires of a wire filtering element from loosening and becoming removed from the element and passing out the outlet to cause damage to some part of a system requiring fluid from a filter. The outer solid edge 62 of the filtering element 20 is held against the outer flat edge 61 of spacer 24 by the corrugations of the adjacent spacer 22, and the inner solid edge 64 of the filtering element is held against the inner flat edge 63 of spacer 22 by the corrugations of the adjacent spacer 24. The tightness of the seal between the solid part of the filtering elements and the flat part of the spacer is determined by the amount of pressure applied on the stack of alternate filtering elements 20 and spacers 22 and 24 by the adjusting bolt 60. The adjusting bolt 60 can be locked in place after the filtering unit has been assembled by a lock wire placed through a hole 66 in the head of bolt 60 and a hole 68 in a stationary part of the unit such as the screw 59. This will also prevent the screw from loosening.

The inserting or removing of an assembled filtering unit from the housing unit 2 is done by removing the cover 8. The cover can be secured to the housing unit 2 by any means desired, however, it is shown being held by bolts 70. On the inner side of the cover there is an annular ridge 72 which receives spring 12 to hold the filtering unit in operating position within the housing unit. The spring 12 engages the filtering unit within the channel cross section of the lower circular support plate.

The cover plate 8 has a plug 74 which is used to drain the fluid from the housing unit 2. A rubber O seal ring 76 is provided to prevent any leakage of fluid around said plug during normal operation of the filter.

While the plates 16 and 18 have been described as circular, and the spacers 22, 24 and filter elements 20 have been shown as circular, it is to be understood that the filtering unit 10 need not be of only a circular form but can be constructed having any shape.

*Operation*

Fluid to be filtered enters by the inlet 4 into the housing unit 2. From there the fluid passes into filtering unit 10 through the outer corrugations of the spacers 22, through the filtering elements 20, and out of the inner corrugation of the spacers 24 to the perforated tube 14. The fluid then passes through the perforations into the tube 14. The pressure of the fluid now overcomes the force that spring 46 exerts on the check valve 38. As fluid pressure overcomes that force, it is allowed to pass through the outlet 6 of the housing unit 2.

It is to be understood that the invention is not limited to the specific embodiment herein illustrated and described, but may be used in other ways without departure from its spirit as defined in the following claims.

I claim:

1. An oil filter pack comprising a perforated central member, a plurality of annular filtering members, an annular fluted intercalary member located between each pair of adjacent filtering members and in face to face contact therewith, said central member extending through the central opening of said filtering and intercalary members, one of said intercalary members of an adjacent pair thereof having a plurality of upper and lower radial channels extending from the outer edge thereof to a place short of the inner edge thereof and the other intercalary member of said pair having a plurality of upper and lower channels extending from the inner edge thereof to a place short of the outer edge thereof.

2. A filter comprising a rigid tube having perforations therethrough, said tube having a collar at one end, the other end of said tube having a stiffening element within said tube, a downwardly enlarged flanged collar fixed to said other end of said tube having a projecting cylindrical portion and a flange, a plate adjacent said first mentioned collar having a flange extending outwardly from the collar, filtering means having filtering elements with spacers therebetween, spacers on the upstream side of the filtering elements having channels leading to said filtering elements, and spacers on the downstream side of the filtering elements having channels leading to said tube, threaded means extending through said plate, supported by said tube and forcing said plate toward said filtering means, a housing surrounding the above described elements, said plate contacting said housing near one end thereof, said cylindrical portion of said flanged collar contacting said housing near its other end, said housing having an inlet opening therethrough adjacent the outer surfaces of said filtering elements, said housing also having an outlet from said tube.

3. A filter pack comprising a perforated member, a plurality of filtering members, with each having an internal opening therethrough, an intercalary member located between each pair of adjacent filtering members and in face to face contact therewith and having an internal opening therethrough, said perforated member extending through said openings in said filtering and intercalary members, each one of an adjacent pair of intercalary members differing from the other, with one being radially fluted from its outer edge inwardly towards and terminating a material distance short of the inner edge thereof and the other being radially fluted from its inner edge outwardly towards and terminating short of the outer edge thereof.

4. An oil filter pack comprising a perforated central member, a plurality of annular filter discs, an annular fluted intercalary sheet metal disc located between each pair of adjacent filter discs and in face to face contact therewith, said central member extending through central openings in said filter discs and intercalary members, one of said intercalary members of an adjacent pair thereof having a substantially flat inner marginal portion and a plurality of upper and lower radial channels extending from the outer edge thereof towards and terminating at said marginal portion, and the other intercalary member of said pair having a substantially flat outer marginal portion and a plurality of upper and lower radial channels extending from the inner edge thereof towards and terminating at said outer marginal portion, the longitudinal edges of said channels of adjacent members being inclined at approximately the same extent.

5. A filler comprising a casing, a filter pack located therein and comprising a perforated central member, a plurality of filtering members, with each having a central opening therethrough, an intercalary member located between each pair of adjacent filtering members and in face to face contact therewith and having a central opening therethrough, said perforated central member extending through said central openings in said filtering and intercalary members, each one of an adjacent pair of intercalary members differing from the other, with one being radially fluted from its outer edge inwardly towards and terminating a material distance short of the inner edge thereof and the other being radially fluted from its inner edge outwardly towards and terminating short of the outer edge thereof, means for the passage of liquid to be filtered into said casing, and means communicating with said central perforated member for the passage of filtered liquid out of said casing.

6. The device of claim 2 in which said filtering means comprise a plurality of filtering members, with each having a central opening therethrough, intercalary members located between adjacent filtering members, adjacent intercalary members differing from each other in that one is radially fluted from its outer edge inwardly towards and terminating a material distance short of the inner edge thereof and the other is radially fluted from its inner edge outwardly towards and terminating short of the outer edge thereof.

7. A filter comprising a filter-pack, a collar in engagement with one end of said filter-pack and a plate in engagement with the other end, a housing, said collar contacting said housing near one end thereof, said plate contacting said housing near the opposite end thereof, and said pack lying substantially between opposing surfaces of said plate and said collar and comprising a perforated central member, a plurality of filtering members, with each having a central opening therethrough, an intercalary member located between each pair of adjacent filtering members and in face to face contact therewith and having a central opening therethrough, said perforated central member extending through said central openings in said filtering and intercalary members, each one of an adjacent pair of intercalary members differing from the other, with one being radially fluted from its outer edge inwardly towards and terminating a material distance short of the inner edge thereof and the other being radially fluted from its inner edge outwardly towards and terminating short of the outer edge thereof.

8. A filter pack comprising a plurality of filtering members, with each having a central opening therethrough, an intercalary member located between each pair of adjacent filtering members and having a central opening therethrough, each one of an adjacent pair of intercalary members differing from the other, with one being radially fluted from its outer edge inwardly towards and terminating a material distance short of the inner edge thereof and the other being radially fluted from its inner edge outwardly towards and terminating short of the outer edge thereof, each pair of adjacent intercalary members disposed in face to face relation so as to form a plurality of radial channels therebetween, and means for holding said filtering and intercalary members in a pack.

9. A filter pack comprising a plurality of filtering members, with each having a central opening therethrough, an intercalary member located between each pair of adjacent filtering members and having a central opening therethrough, each one of an adjacent pair of intercalary members differing from the other, with one being radially fluted from its outer edge inwardly towards and terminating a material distance short of the inner edge thereof and the other being radially fluted from its inner edge outwardly towards and terminating a material distance short of the outer edge thereof, the entire surface of each being fluted except as to the material distance, each pair of adjacent intercalary members disposed in face to face relation so as to form a plurality of radial channels therebetween, and means for holding said filtering and intercalary members in a pack.

10. A filtering unit having a series of stacked discs, said stacked discs each having a central hole and consisting alternately of filter elements and spacers, alternate spacers being of different construction, the spacers of one construction each having radially extending tapering corrugations having the maximum depth of the tapered corrugations at its outer edge and tapering down and extending nearly to its inner edge, the inner edge of this spacer providing contact with the inner edges of its adjacent filter elements, and the spacers of the second construction each having radially extending tapering corrugations having the maximum depth of the tapered corrugations at its inner edge and tapering down and extending nearly to its outer edge, the outer edge of this second spacer providing contact with the outer edges of its adjacent filter elements, and means for holding said series of stacked discs in close relationship.

11. A filtering unit having a series of stacked discs, said stacked discs each having a central hole and consisting alternately of filter elements and spacers, alternate spacers being of different construction, the spacers of one construction each having radially extending tapering corrugations having the maximum depth of the tapered corrugations at its outer edge and tapering down and extending nearly to its inner edge, the inner edge of this spacer providing contact with the inner edges of its adjacent filter elements, and the spacers of the second construction each having radially extending tapering corrugations having the maximum depth of the tapered corrugations at its inner edge and tapering down and extending nearly to its outer edge, the outer edge of this second spacer providing contact with the outer edges of its adjacent filter elements, said filter elements having means around their outer periphery making each periphery substantially solid, and means for holding said series of stacked discs in close relationship.

References Cited in the file of this patent

UNITED STATES PATENTS

| Number | Name | Date |
|---|---|---|
| 435,096 | Hoops | Aug. 26, 1890 |
| 900,104 | Kessler | Oct. 6, 1908 |
| 2,109,014 | Colas | Feb. 13, 1940 |
| 2,298,980 | Sloan et al. | Oct. 13, 1942 |
| 2,325,399 | Houston | July 27, 1943 |
| 2,359,475 | Gauthier | Oct. 3, 1944 |
| 2,372,865 | Taylor | Apr. 3, 1945 |
| 2,413,991 | Newman | Jan. 7, 1947 |
| 2,452,486 | O'Meara | Oct. 26, 1948 |
| 2,495,095 | Ewbank | Jan. 17, 1950 |
| 2,548,584 | Briggs | Apr. 10, 1951 |
| 2,597,235 | Ericson | May 20, 1952 |

FOREIGN PATENTS

| Number | Country | Date |
|---|---|---|
| 109,892 | Australia | Mar. 7, 1940 |
| 28,453 | Netherlands | Dec. 15, 1932 |